(12) United States Patent
Konno

(10) Patent No.: US 10,619,722 B2
(45) Date of Patent: Apr. 14, 2020

(54) CHAIN AND CHAIN TRANSMISSION DEVICE

(71) Applicant: TSUBAKIMOTO CHAIN CO., Osaka-shi, Osaka (JP)

(72) Inventor: Masahiko Konno, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 84 days.

(21) Appl. No.: 15/878,617

(22) Filed: Jan. 24, 2018

(65) Prior Publication Data
US 2018/0223985 A1    Aug. 9, 2018

(30) Foreign Application Priority Data
Feb. 6, 2017   (JP) .................... 2017-19665

(51) Int. Cl.
*F16H 57/05* (2006.01)
*F16G 13/18* (2006.01)
(Continued)

(52) U.S. Cl.
CPC ............ *F16H 57/05* (2013.01); *F16G 13/06* (2013.01); *F16G 13/18* (2013.01); *F16H 7/06* (2013.01); *F16H 7/08* (2013.01); *F16H 7/18* (2013.01); *F16H 2007/0872* (2013.01); *F16H 2007/185* (2013.01)

(58) Field of Classification Search
CPC .......... F16G 13/00; F16G 13/02; F16G 13/06; F16G 13/08; F16G 13/18; F16G 1/00; F16G 1/24; F16G 5/18; F16G 5/163; F16G 5/16; F16G 5/00; F16H 7/06; F16H 7/08; F16H 7/18; F16H 2007/185; F16H 2007/0872
See application file for complete search history.

(56) References Cited

U.S. PATENT DOCUMENTS 4,434,556 A * 3/1984 Nitschmann .......... B27B 33/147
                                                      184/15.1
5,758,484 A * 6/1998 Ledvina .................. F16G 13/04
                                                        474/206
(Continued)

FOREIGN PATENT DOCUMENTS

CN       1831374 A    9/2006
CN     105840734 A    8/2016
(Continued)

*Primary Examiner* — Michael R Mansen
*Assistant Examiner* — Raveen J Dias
(74) *Attorney, Agent, or Firm* — Westerman, Hattori, Daniels & Adrian, LLP

(57) ABSTRACT

An object of the present invention is to provide a chain and a chain transmission device capable of reducing sliding resistance of the chain to a guide lip portion and stably maintaining an oil film between the guide lip portion and an outer plate. Provided is a chain 20 wherein a plurality of link plates 40 and 60 include outer plates 60, each of the outer plates 60 has a pair of front and rear pin holes 61 into which connecting pins 50 are inserted, a guide-side end surface 62 that faces the side of a traveling guide surface 81a of a chain guide 80, and a concave portion 63 that is formed in an outer surface of the outer plate 60, and the concave portion 63 is formed in an area between the pin holes 61 and the guide-side end surface 62 in a plate height direction.

2 Claims, 18 Drawing Sheets

(51) Int. Cl.
*F16G 13/06* (2006.01)
*F16H 7/06* (2006.01)
*F16H 7/08* (2006.01)
*F16H 7/18* (2006.01)

(56) References Cited

U.S. PATENT DOCUMENTS

| | | | |
|---|---|---|---|
| 6,220,981 B1* | 4/2001 | Yoshida | F16G 13/06 474/111 |
| 9,797,483 B2* | 10/2017 | Kurono | F16H 7/18 |
| 2003/0236145 A1 | 12/2003 | Ledvina et al. | |
| 2006/0079363 A1* | 4/2006 | Miyazawa | F16G 13/06 474/206 |
| 2006/0172836 A1 | 8/2006 | Mori et al. | |
| 2006/0205548 A1 | 9/2006 | Konno | |
| 2007/0180808 A1* | 8/2007 | Wu | F16G 13/06 59/84 |
| 2008/0020882 A1* | 1/2008 | Tohara | F16G 13/02 474/212 |
| 2009/0286642 A1* | 11/2009 | Takagishi | F16G 13/06 474/231 |
| 2010/0016110 A1 | 1/2010 | Yoshida | |
| 2010/0236900 A1* | 9/2010 | Kremer | B65G 17/38 198/845 |
| 2011/0183800 A1* | 7/2011 | Tohara | F16G 13/02 474/206 |
| 2012/0035012 A1* | 2/2012 | Yoshimura | F16G 13/04 474/213 |
| 2013/0196804 A1* | 8/2013 | Bodensteiner | F16G 13/02 474/148 |
| 2015/0204437 A1* | 7/2015 | Utaki | F16H 7/18 474/91 |
| 2015/0292597 A1* | 10/2015 | Fukumori | F16G 15/12 474/226 |
| 2016/0223053 A1 | 8/2016 | Rampp et al. | |
| 2016/0238104 A1* | 8/2016 | Vroman | F16H 7/06 |
| 2018/0223969 A1* | 8/2018 | Konno | F16H 7/08 |
| 2018/0252301 A1* | 9/2018 | Konno | F16H 7/18 |

FOREIGN PATENT DOCUMENTS

| | | |
|---|---|---|
| JP | 8-233038 A | 9/1996 |
| JP | 2003-294089 A | 10/2003 |
| JP | 2006-200577 A | 8/2006 |
| JP | 2014-001763 A | 1/2014 |
| KR | 10-2009-0094017 A | 9/2009 |
| KR | 10-1074639 B1 | 10/2011 |

* cited by examiner

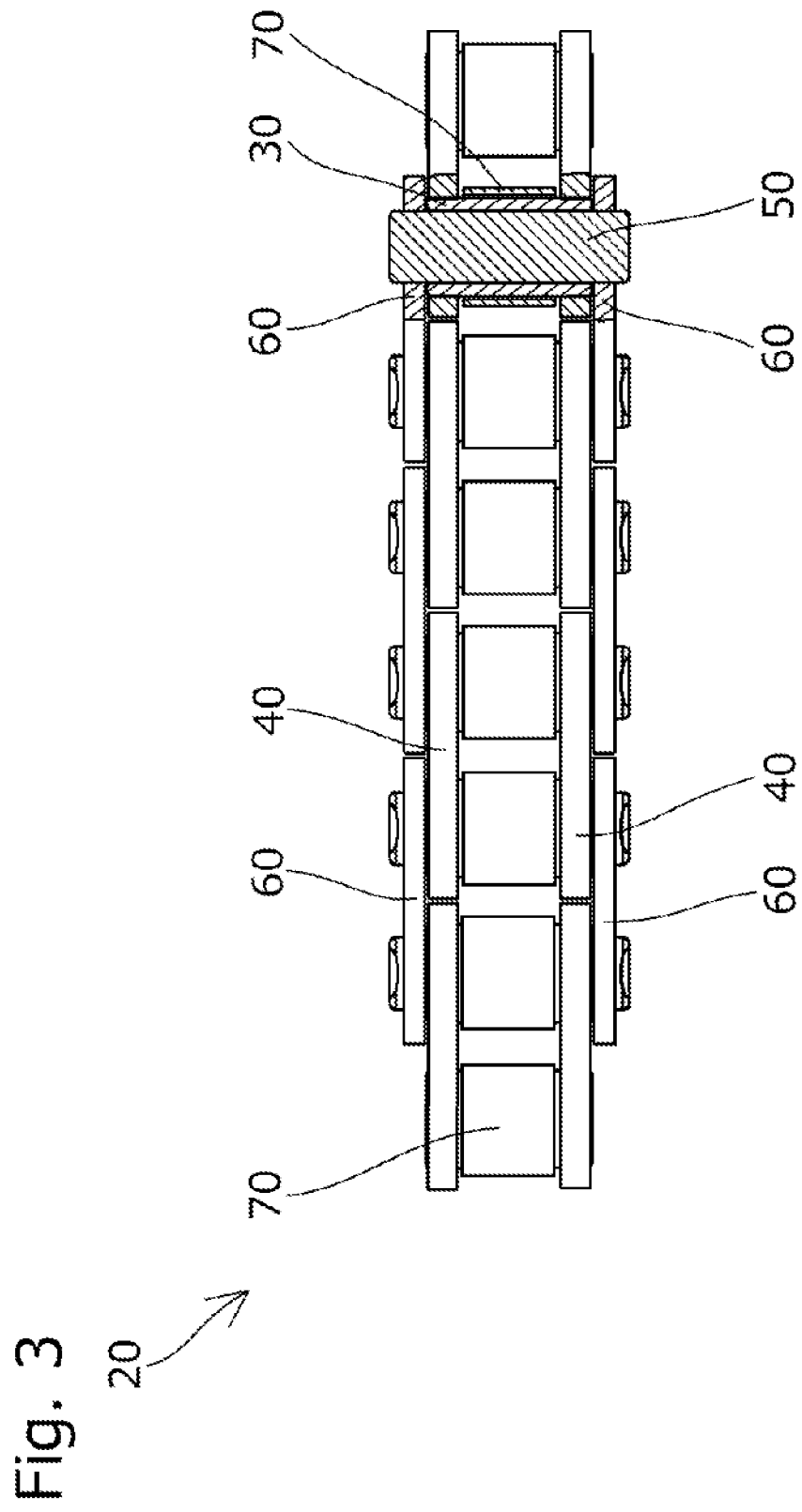

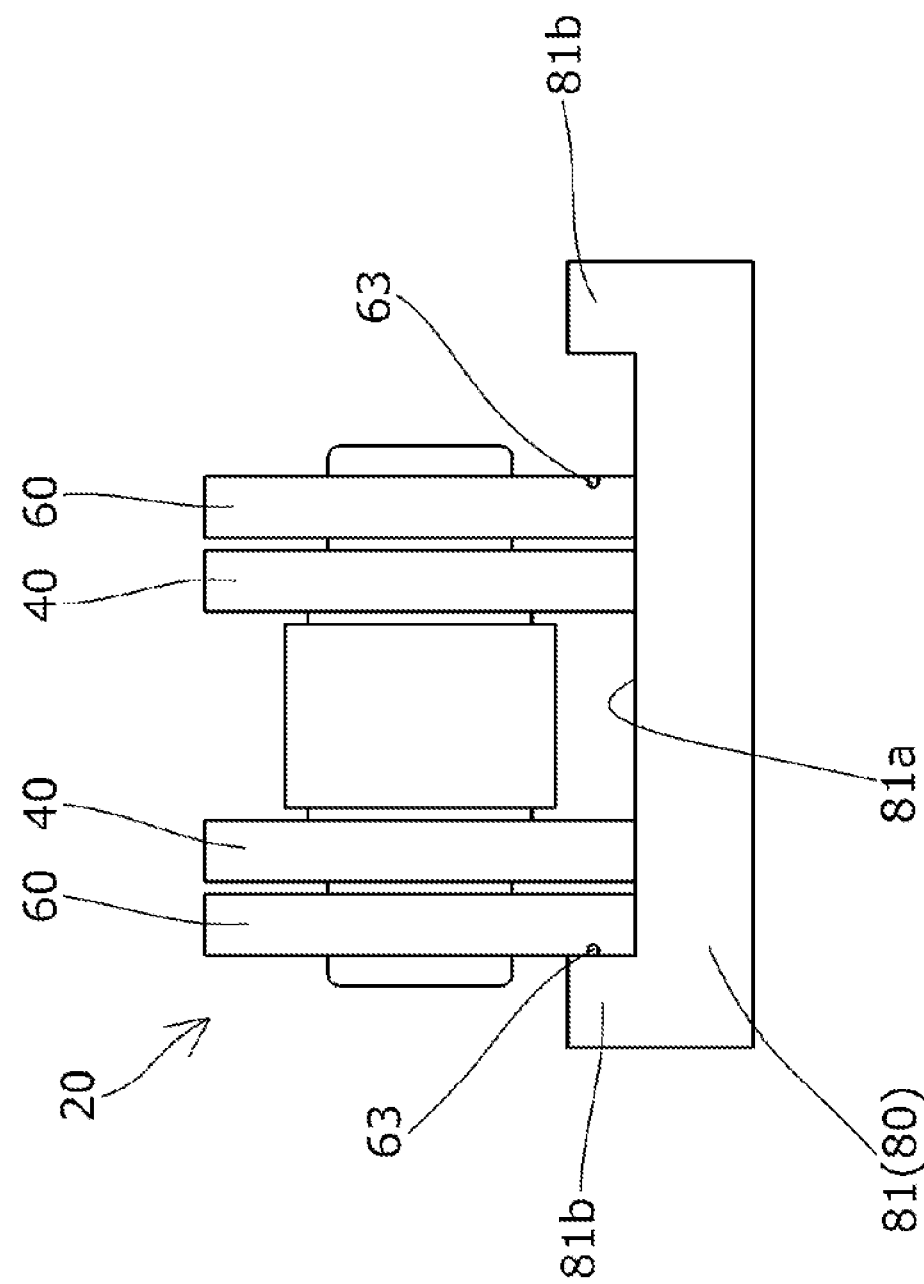

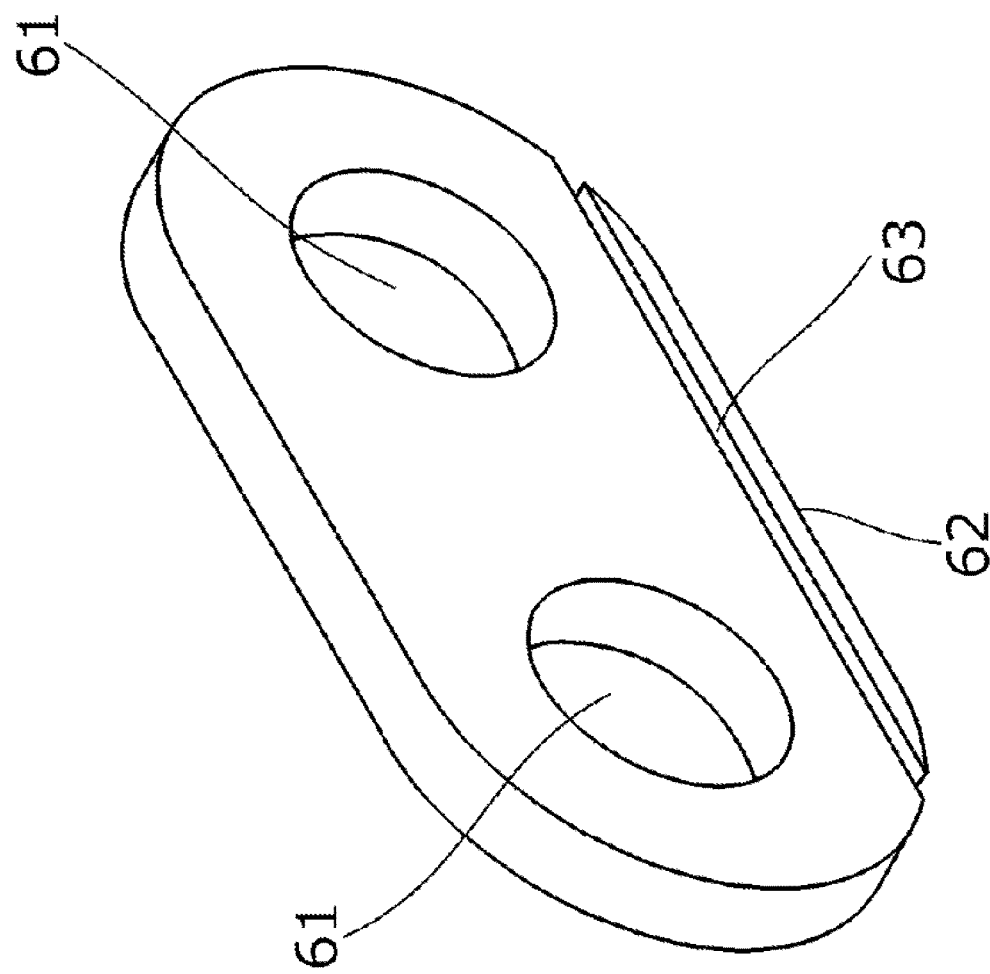

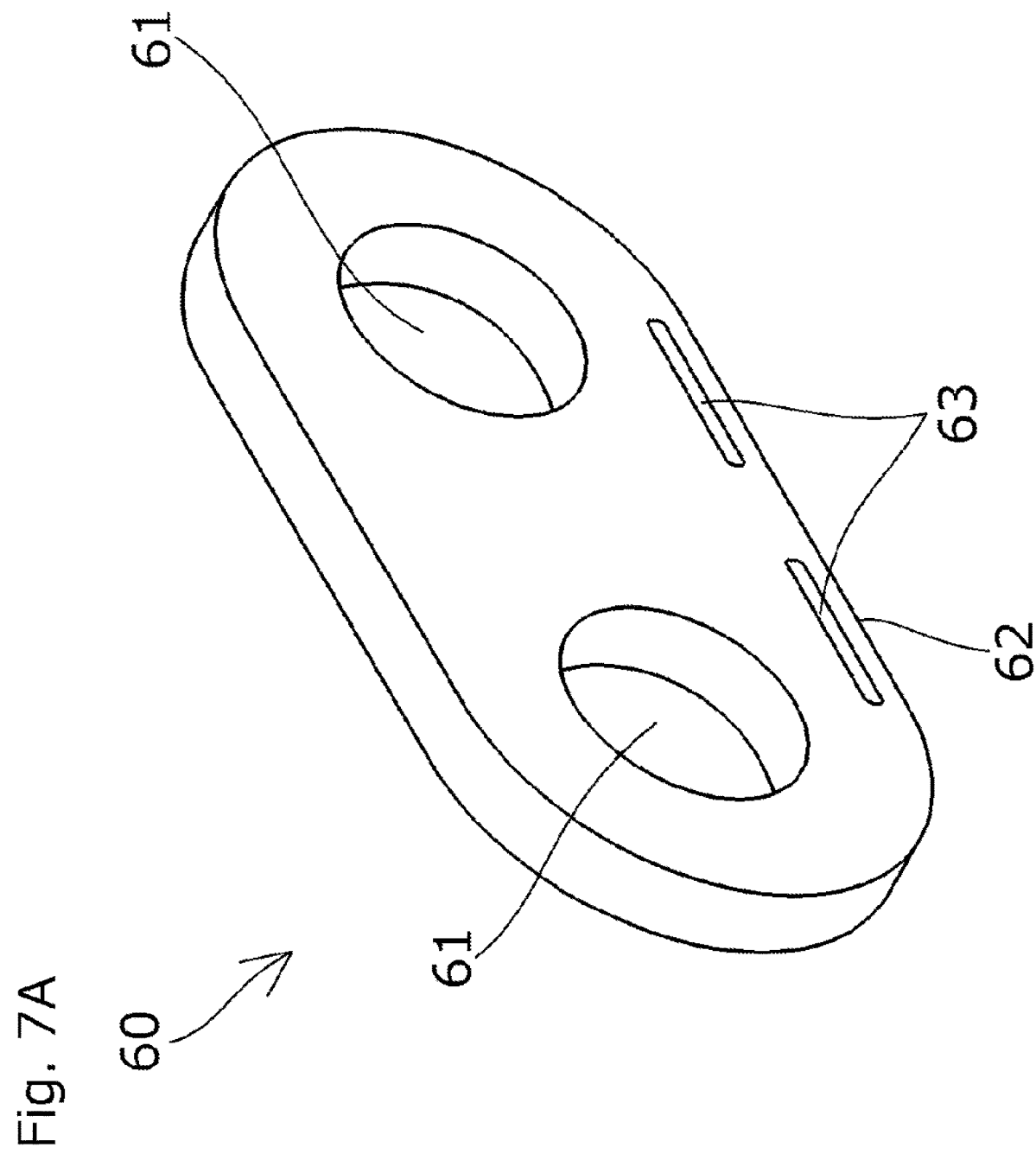

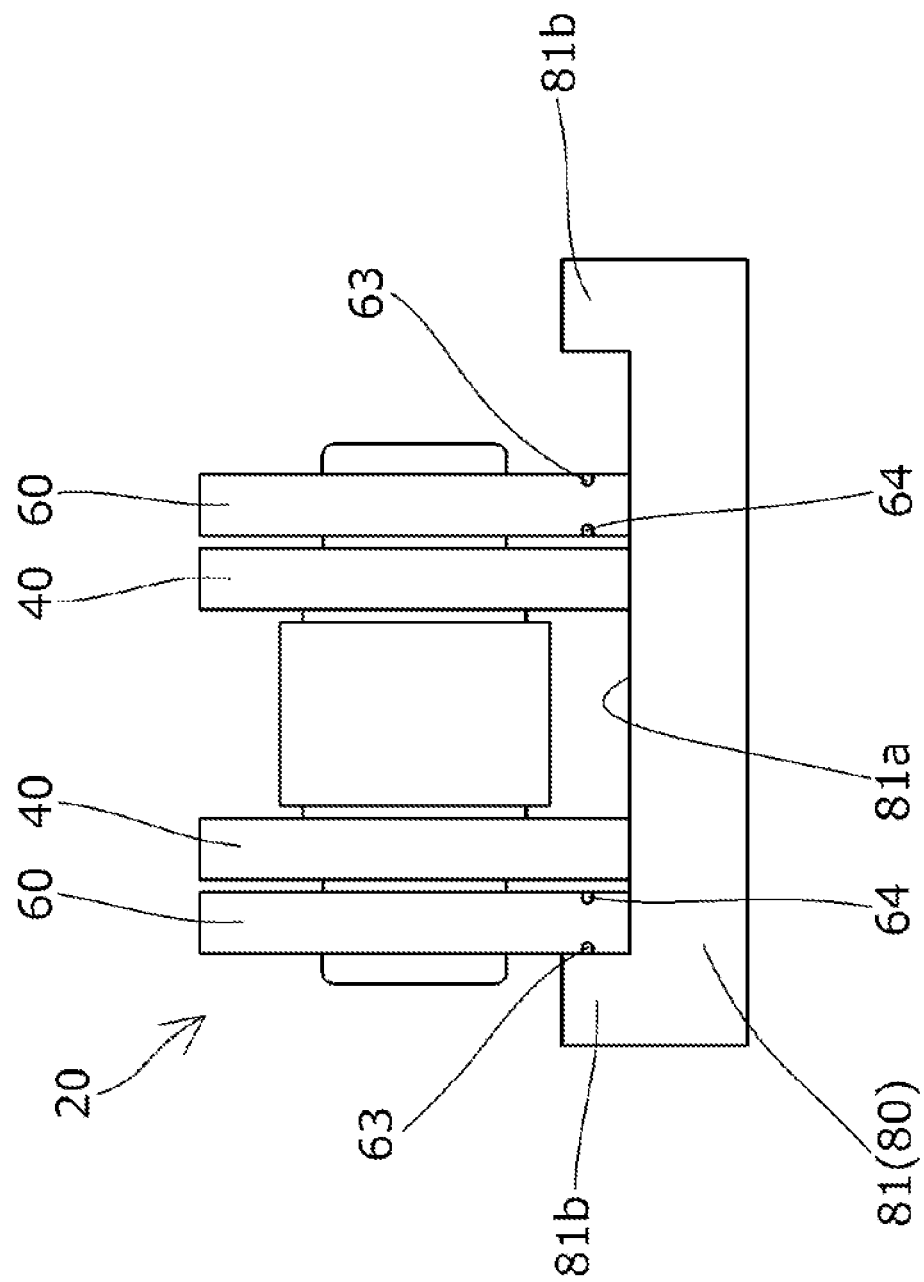

CHAIN AND CHAIN TRANSMISSION DEVICE

BACKGROUND OF THE INVENTION

1. Field of the Invention

The present invention relates to a chain in which a plurality of link plates are pivotably connected with a connecting pin, and a chain transmission device.

2. Description of the Related Art

Conventionally, there is known a chain transmission device that is incorporated in a timing system or the like in an engine room of an automobile, and includes a chain such as a roller chain that is wound around a plurality of sprockets, and a chain guide that maintains chain tension appropriately (see, e.g., Japanese Patent Application Publication No. 2006-200577).

The chain guide is formed with a traveling guide surface that slidably guides a link plate of the chain, and guide lip portions that protrude upward at both ends of the traveling guide surface in a width direction, and the guide lip portions prevent the chain from being fallen from the chain guide even in the case where the chain is displaced to one side in a chain width direction when the chain travels on the traveling guide surface.

SUMMARY OF THE INVENTION

In the conventional chain transmission device, in the case where the chain is displaced to one side in the chain width direction when the chain travels on the traveling guide surface of the chain guide, an outer surface of an outer plate comes into sliding contact with an inner surface of the guide lip portion in a guide longitudinal direction, and hence the conventional chain transmission device has a problem that the sliding resistance thereof is large and fuel economy performance of an automobile engine deteriorates.

In addition, in the case where the curve of the chain guide along the guide longitudinal direction is large and the radius of curvature of the traveling guide surface is small, pressure from the chain to the inner surface of the guide lip portion increases when the chain is stretched, and hence the above problem becomes worse.

Further, when the chain travels in a state in which the outer surface of the outer plate is in contact with the inner surface of the guide lip portion, there are cases where an oil film between the inner surface of the guide lip portion and the outer surface of the outer plate becomes thin or runs out in the vicinity of the center in the guide longitudinal direction, and hence wear of the inner surface of the guide lip portion progresses and, as a result, it is feared that the smooth traveling of the chain may be hindered, or the guide lip portion may be damaged and the chain may fall off.

The present invention has been made in order to solve these problems, and an object thereof is to provide the chain and the chain transmission device capable of reducing the sliding resistance of the chain to the guide lip portion and stably maintaining the oil film between the guide lip portion and the outer plate.

A chain of the present invention is a chain including a plurality of link plates, and connecting pins that pivotably connect the plurality of link plates, wherein the plurality of link plates include outer plates disposed on both outer sides in a chain width direction, each of the outer plates has a pair of front and rear pin holes into which the connecting pins are inserted, a guide-side end surface that faces a traveling guide surface side of a chain guide, and a concave portion that is formed in an outer surface of the outer plate, and the concave portion is formed in an area between the pin holes and the guide-side end surface in a plate height direction, whereby the above problems are solved.

A chain transmission device of the present invention is a chain transmission device including the chain, and a chain guide that slidably guides the chain, wherein the chain guide has a traveling guide surface that slidably guides the chain, and a guide lip portion that protrudes upward at least at one end of the traveling guide surface in a guide width direction, and the concave portion is formed at a height position such that the concave portion faces an inner surface of the guide lip portion when the chain is displaced to one side in the chain width direction, whereby the above problems are solved.

According to one aspect of the present invention, the concave portion formed in the outer surface of the outer plate is formed in the area between the pin holes and the guide-side end surface in the plate height direction, whereby the concave portion formed in the outer surface of the outer plate functions as an oil storage portion, and hence, even in the case where the chain is displaced to one side in the chain width direction and the outer surface of the outer plate comes into contact with the inner surface of the guide lip portion, a lubricant is supplied to space between the guide lip portion and the outer plate from the concave portion, and it is possible to reduce sliding resistance between the guide lip portion and the outer plate.

In addition, it is possible to cool heat generated by sliding contact between the guide lip portion and the outer plate with the lubricant supplied to the concave portion, and hence it is possible to suppress an increase in the temperature of the chain guide. With this, it is possible to suppress the progress of thermal degradation of the chain guide to achieve an increase in the life of the chain guide. Further, it is possible to maintain the hardness of the chain guide by suppressing the increase in the temperature of the chain guide, and hence it is possible to suppress an increase in sliding resistance.

In addition, even in the case where the chain is displaced to one side in the chain width direction and the outer surface of the outer plate collides with the inner surface of the guide lip portion, it is possible to cause compressed air generated by the collision to escape to the concave portion, and hence it is possible to suppress noises caused by the collision.

Further, it is possible to reduce the contact area of the outer surface of the outer plate with the inner surface of the guide lip portion by forming the concave portion in the outer surface of the outer plate, and hence it is possible to keep an oil film between the inner surface of the guide lip portion and the outer plate from becoming thin or running out to prevent the occurrence of wear of or damage to the guide lip portion, and it is possible to achieve a reduction in the weight of the chain by reducing the mass of the outer plate.

In addition, in the case where the concave portion of the outer plate is formed by press working, it is possible to remove a residual stress of a plate surface, and hence it is possible to improve the strength of the outer plate.

According to another aspect of the present invention, the concave portion is formed into a belt-like shape that extends along a chain longitudinal direction, whereby it is possible to increase the amount of the oil that can be stored in the concave portion, and further reduce the contact area of the outer surface of the outer plate with the inner surface of the guide lip portion.

According to still another aspect of the present invention, the belt-like concave portion that extends along the chain longitudinal direction reaches one end edge and another end edge of the outer plate in the chain longitudinal direction, whereby it is possible to supply the lubricant to the concave portion from the outside, and it is also possible to release the heat generated by the sliding contact between the guide lip portion and the outer plate and the above-mentioned compressed air to the outside by using the belt-like concave portion.

According to yet another aspect of the present invention, it is possible to improve the above-described effects such as the effect that it is possible to increase the amount of the oil that can be stored in the concave portion by forming the concave portion in plurality, and it is also possible to suppress a reduction in the strength of the outer plate caused by forming the concave portions by adjusting the formation position of the concave portion.

According to further aspect of the present invention, a second concave portion is formed in an inner surface of the outer plate at a position corresponding to a position of the concave portion in the outer surface of the outer plate, whereby it is possible to further reduce the mass of the outer plate and also make the shapes of the outer surface and the inner surface of the outer plate identical to each other, and hence it is not necessary to cause the orientations (the front sides or the back sides) of the outer plates to face the same direction when the chain is assembled, and it is possible to reduce manufacturing cost. In addition, it is possible to cause the second concave portion to perform the function as the oil storage portion, and hence it is possible to reduce the sliding resistance between the outer plate and an inner plate.

According to still further aspect of the present invention, a convex portion is formed in an inner surface of the outer plate at a position corresponding to a position of the concave portion in the outer surface of the outer plate, whereby it is also possible to form concave and convex portions in the outer plate by press working that presses part of the outer plate from the outer surface side to the inner surface side, and hence it is possible to reduce the load of manufacturing the chain. In addition, with the presence of the convex portion that protrudes from the inner surface side of the outer plate, it is possible to avoid an increase in the sliding resistance between the inner surface of the outer plate and the outer surface of the inner plate resulting from adhesion between the inner surface of the outer plate and the outer surface of the inner plate caused by the surface tension of the lubricant.

BRIEF DESCRIPTION OF THE DRAWINGS

FIG. 3 is an explanatory view showing part of a chain in a cross-sectional view;

FIG. 5 is an explanatory view showing a chain traveling state on the chain guide in Embodiment 1;

FIG. 6A is an explanatory view showing the outer plate according to Embodiment 2;

FIG. 7A is an explanatory view showing the outer plate according to Embodiment 3;

FIG. 9 is an explanatory view showing the chain traveling state on the chain guide in Embodiment 4;

DESCRIPTION OF THE PREFERRED EMBODIMENTS

Hereinbelow, a chain transmission device 10 according to Embodiment 1 of the present invention will be described based on the drawings.

Figure 1:
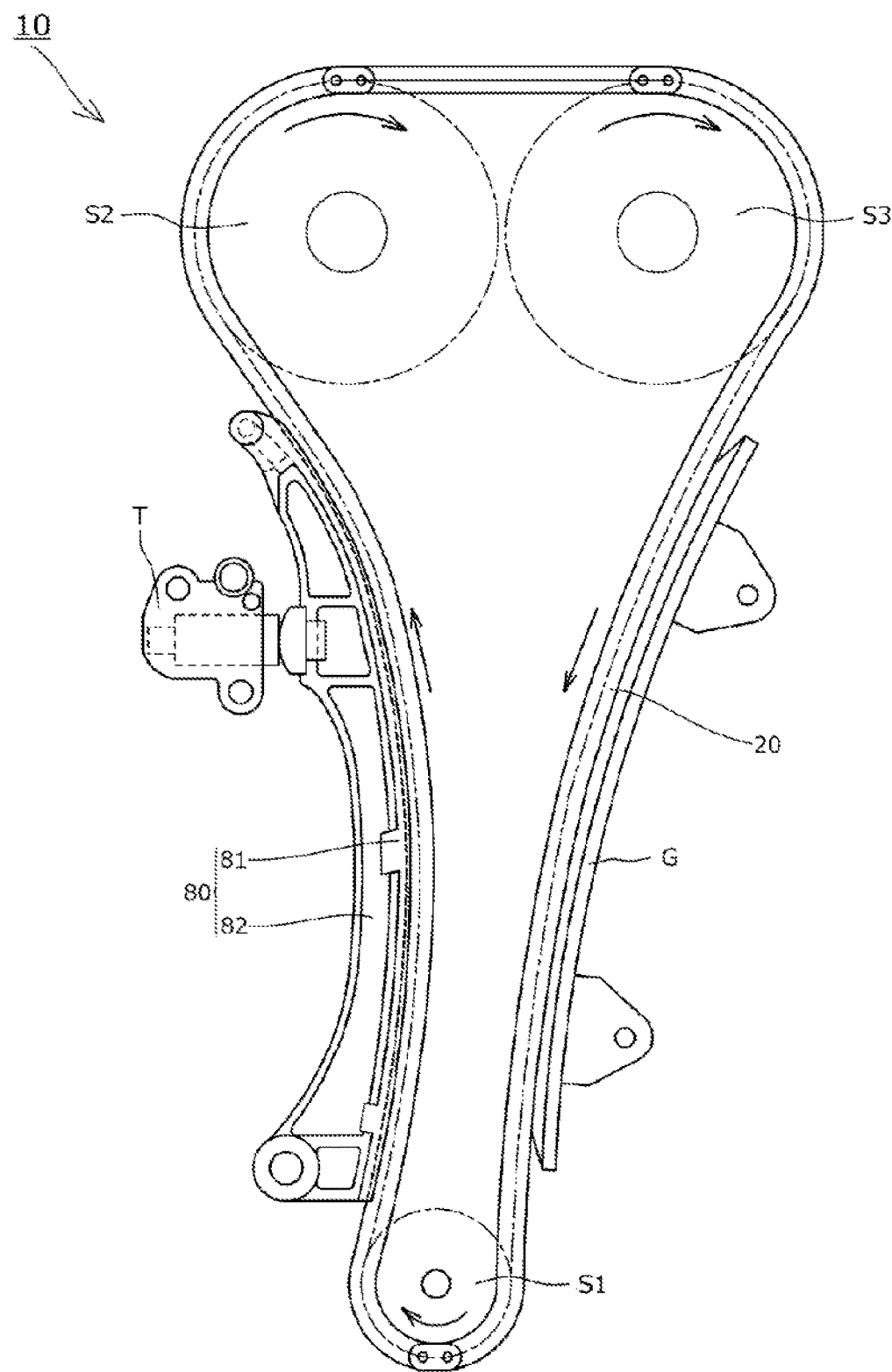
FIG. 1 is an explanatory view showing a used state of a chain transmission device according to Embodiment 1 of the present invention.

An shown in FIG. 1, the chain transmission device 10 is incorporated in a timing system for an automobile engine, and includes sprockets S1 to S3 that are provided in a crankshaft and a camshaft in an engine room, a chain 20 that is wound around the sprockets S1 to S3, a chain guide 80 serving as a movable guide that is installed on a slack side of the chain 20, a fixed guide G that is installed on a tense side of the chain 20, and a tensioner T that presses the chain guide 80 toward the chain 20.

The chain guide 80 is swingably mounted to an engine block (not shown) and slidably guides the chain 20 and, as shown in FIG. 1, the chain guide 80 includes a guide shoe 81 that slidably guides the traveling chain 20, and a base member 82 that supports the guide shoe 81 along a guide longitudinal direction (chain longitudinal direction). Each of the guide shoe 81 and the base member 82 is formed of a synthetic resin material or the like.

Figure 2:
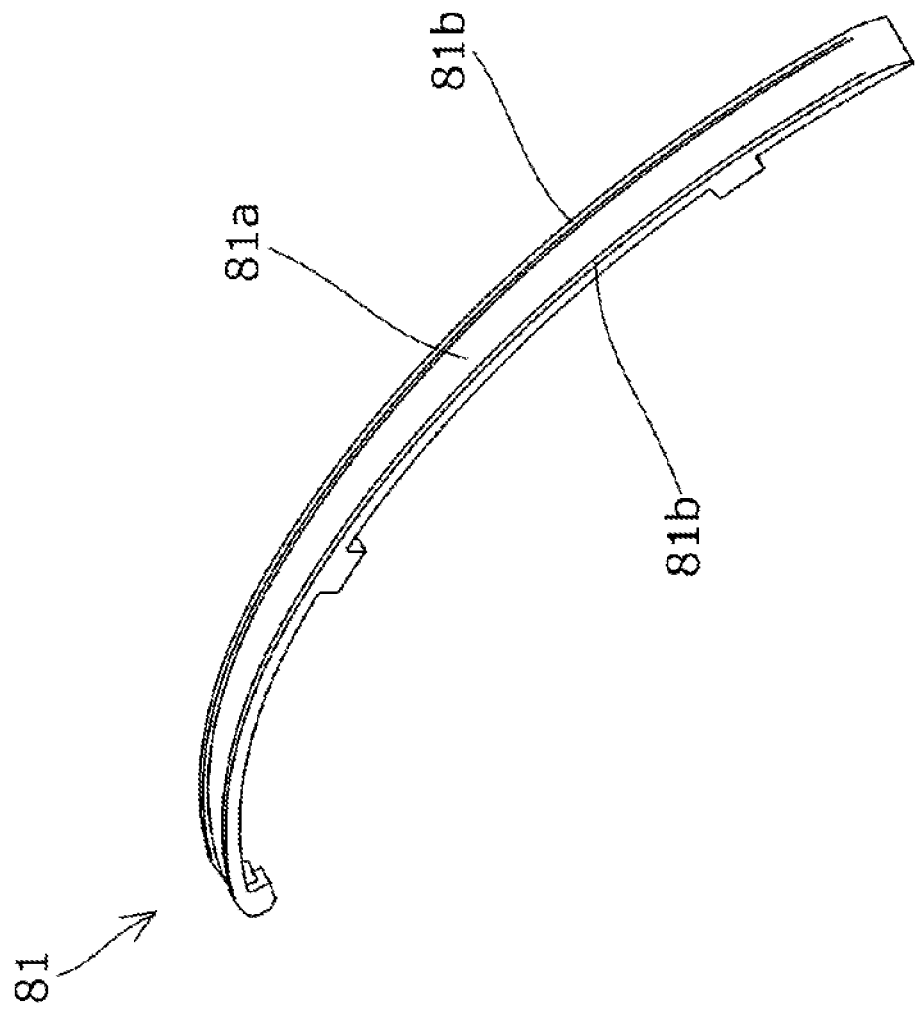
FIG. 2 is a perspective view showing a guide shoe of a chain guide.

As shown in FIG. 2, the guide shoe 81 has a traveling guide surface 81a that extends in the chain longitudinal direction and slidably guides the chain 20, and guide lip portions 81b that protrude upward at both ends of the traveling guide surface 81a in a guide width direction.

An inner surface slope that is inclined toward an inner side in a width direction as it approaches a far side in a chain traveling direction is provided at the end portion of each guide lip portion 81b on a near side in the chain traveling direction. Each inner surface slope is formed into a curved shape (so-called R-shape) that is convex toward the inner-side in the width direction.

The chain 20 is configured as a so-called roller chain and, as shown in FIG. 3, the chain 20 includes a plurality of inner links each obtained by fixing both ends of a pair of front and rear bushings 30 to bushing holes of a pair of left and right inner plates (link plates) 40, a plurality of outer links each obtained by fixing both ends of a pair of front and rear connecting pins 50 to pin holes 61 of a pair of left and right outer plates (link plates) 60, and rollers 70 that are fitted on the bushings 30. The inner links and the outer links are alternately connected in the chain longitudinal direction by inserting the connecting pins 50 into the bushings 30. Both ends of the connecting pin 50 protrude from outer surfaces of the outer plates 60.

Figure 4A:
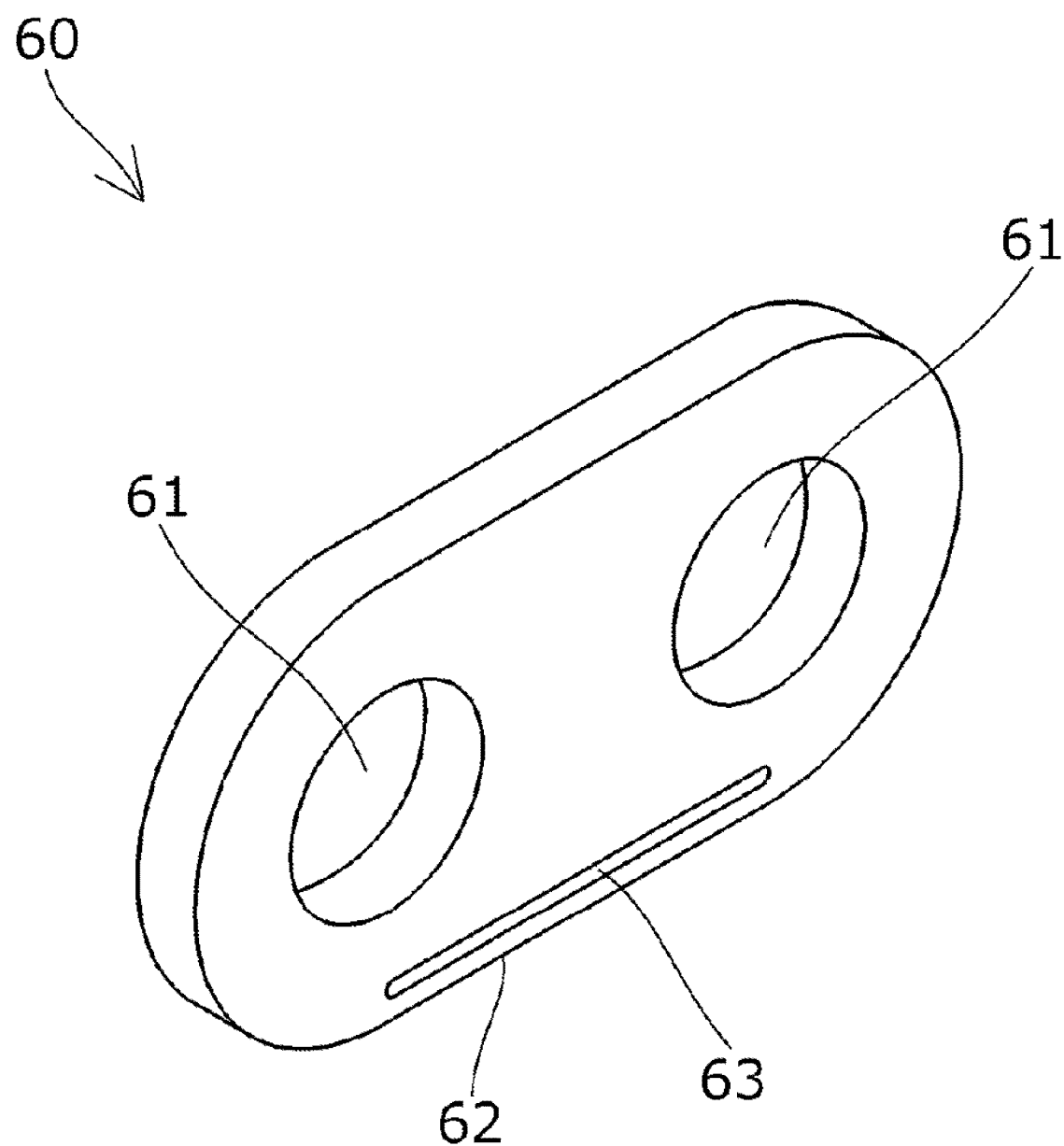
FIG. 4A is an explanatory view showing an outer plate according to Embodiment 1.
Figure 4B:
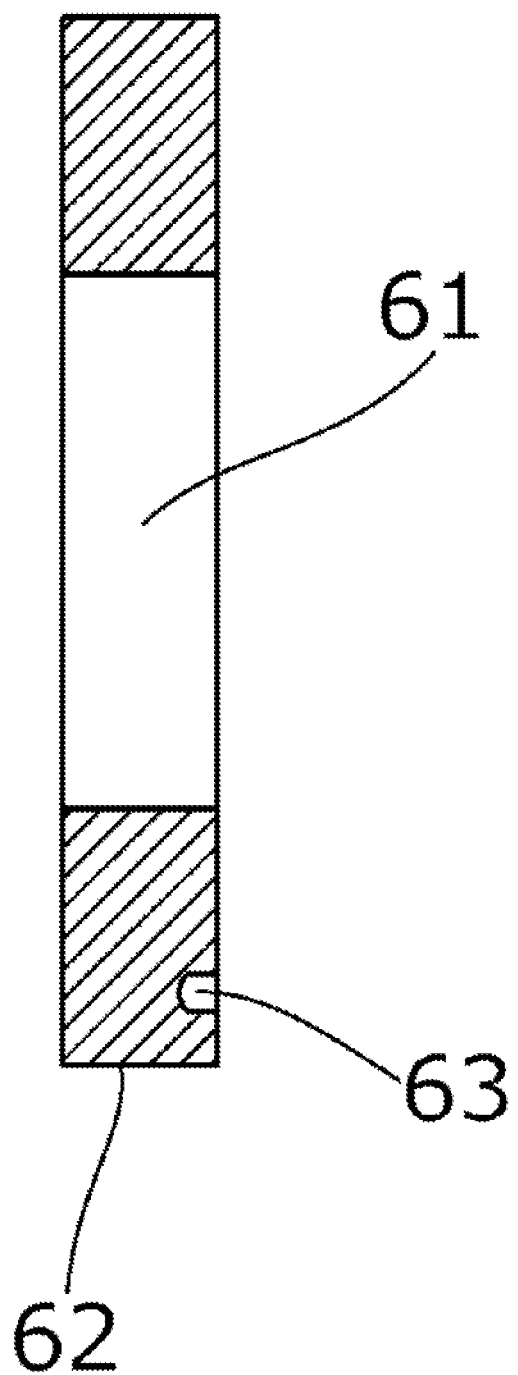
FIG. 4B is an explanatory view showing the outer plate according to Embodiment 1.

As shown in FIGS. 4A and 4B, the outer plate 60 has a pair of front and rear pin holes 61 into which the connecting pins 50 are inserted, a guide-side end surface (lower end surface) 62 that faces the side of the traveling guide surface 81a of the chain guide 80, and a concave portion 63 that is formed in the outer surface of the outer plate 60.

The concave portion 63 is formed by machining the outer surface of the outer plate 60 and, as shown in FIGS. 4A and 4B, the concave portion 63 is formed in an area between the pin hole 61 (the outer edge thereof) and the guide-side end surface 62 in a plate height direction. More specifically, as shown in FIG. 5, the concave portion 63 is formed at a height position such that the concave portion 63 faces an inner surface of the guide lip portion 81b in the case where the chain 20 is displaced to one side in a chain width direction.

As shown in FIGS. 4A and 4B, the concave portion 63 is formed into a belt-like shape that extends along the chain longitudinal direction.

As shown in FIGS. 4A and 4B, both ends of the concave portion 63 in the chain longitudinal direction do not reach one end edge and the other end edge of the outer plate 60 in the chain longitudinal direction. More specifically, the concave portion 63 is formed such that both ends of the concave portion 63 are positioned outwardly, in the chain longitudinal direction, of a line that passes though the center of the pin hole 61 and extends in a direction orthogonal to the chain longitudinal direction.

In addition, the cross-sectional shape (the cross-sectional shape in the case where the concave portion 63 is viewed cross-sectionally in a virtual plane orthogonal to the chain longitudinal direction) of the concave portion 63 is formed into a semicircular or substantially semicircular shape.

Next, the chain transmission device 10 according to Embodiment 2 of the present invention will be described based on FIGS. 6A and 6B. Herein, Embodiment 2 is exactly the same as Embodiment 1 described above except part of the configuration of the outer plate 60, and hence the description of the configuration other than the difference will be omitted.

Figure 6B:
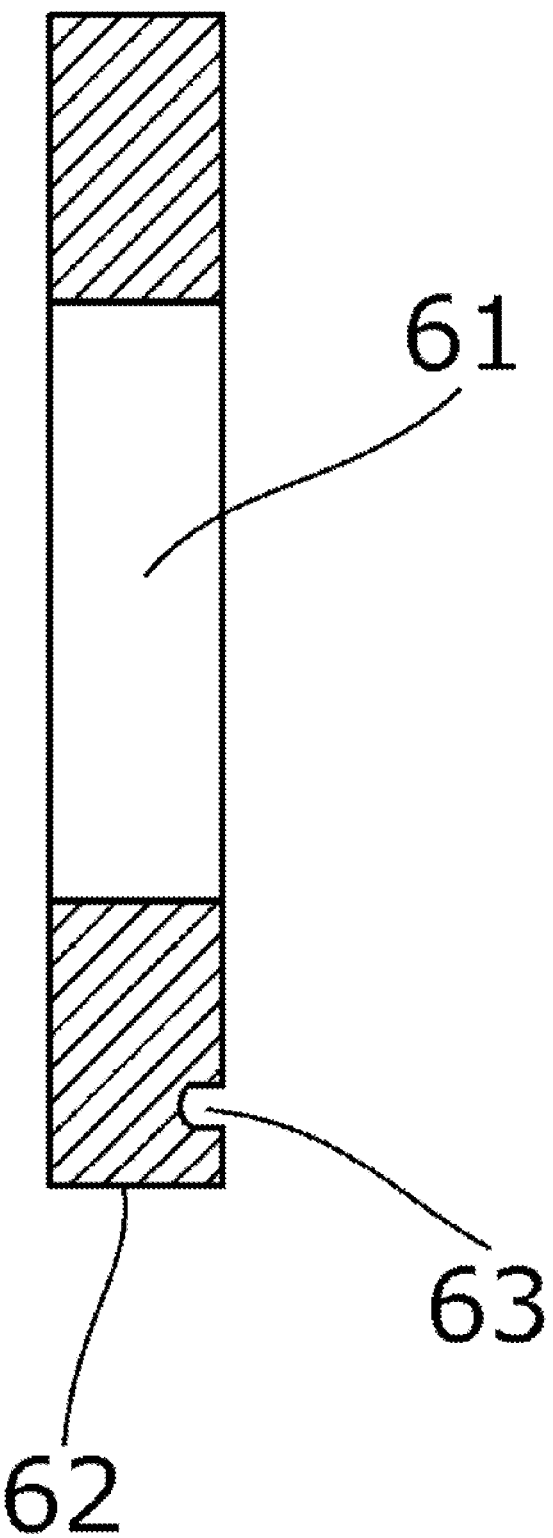
FIG. 6B is an explanatory view showing the outer plate according to Embodiment 2.

In Embodiment 2, as shown in FIGS. 6A and 6B, the concave portion 63 is formed so as to reach one end edge and the other end edge of the outer plate 60 in the chain longitudinal direction.

Next, the chain transmission device 10 according to Embodiment 3 of the present invention will be described based on FIGS. 7A and 7B. Herein, Embodiment 3 is exactly the same as Embodiment 1 described above except part of the configuration of the outer plate 60, and hence the description of the configuration other than the difference will be omitted.

Figure 7B:
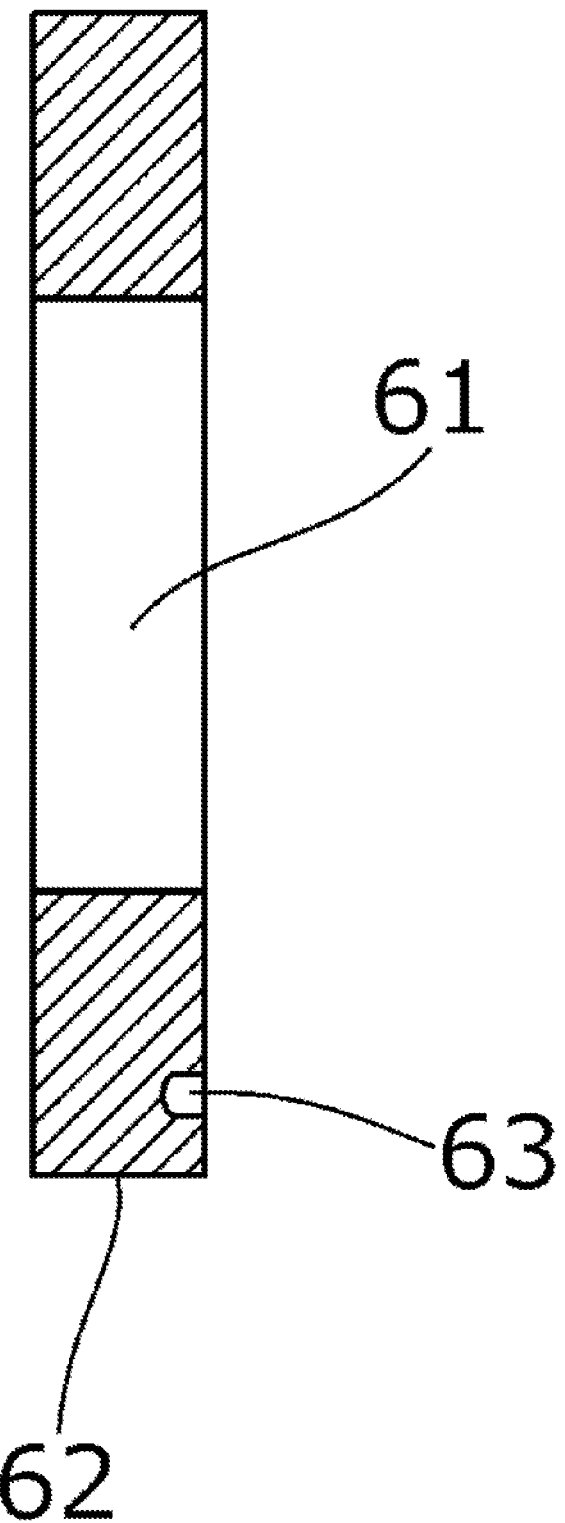
FIG. 7B is an explanatory view showing the outer plate according to Embodiment 3.

In Embodiment 3, as shown in FIGS. 7A and 7B, the concave portion 63 is formed in plurality so as to be arranged in the chain longitudinal direction. Note that two concave portions 63 are formed in an example shown in each of FIGS. 7A and 7B, but the number of concave portions 63 may be any number such as three or more.

Next, the chain transmission device 10 according to Embodiment 4 of the present invention will be described based on FIGS. 8A and 8B and FIG. 9. Herein, Embodiment 4 is exactly the same as Embodiment 1 described above except part of the configuration of the outer plate 60, and hence the description of the configuration other than the difference will be omitted.

Figure 8A:
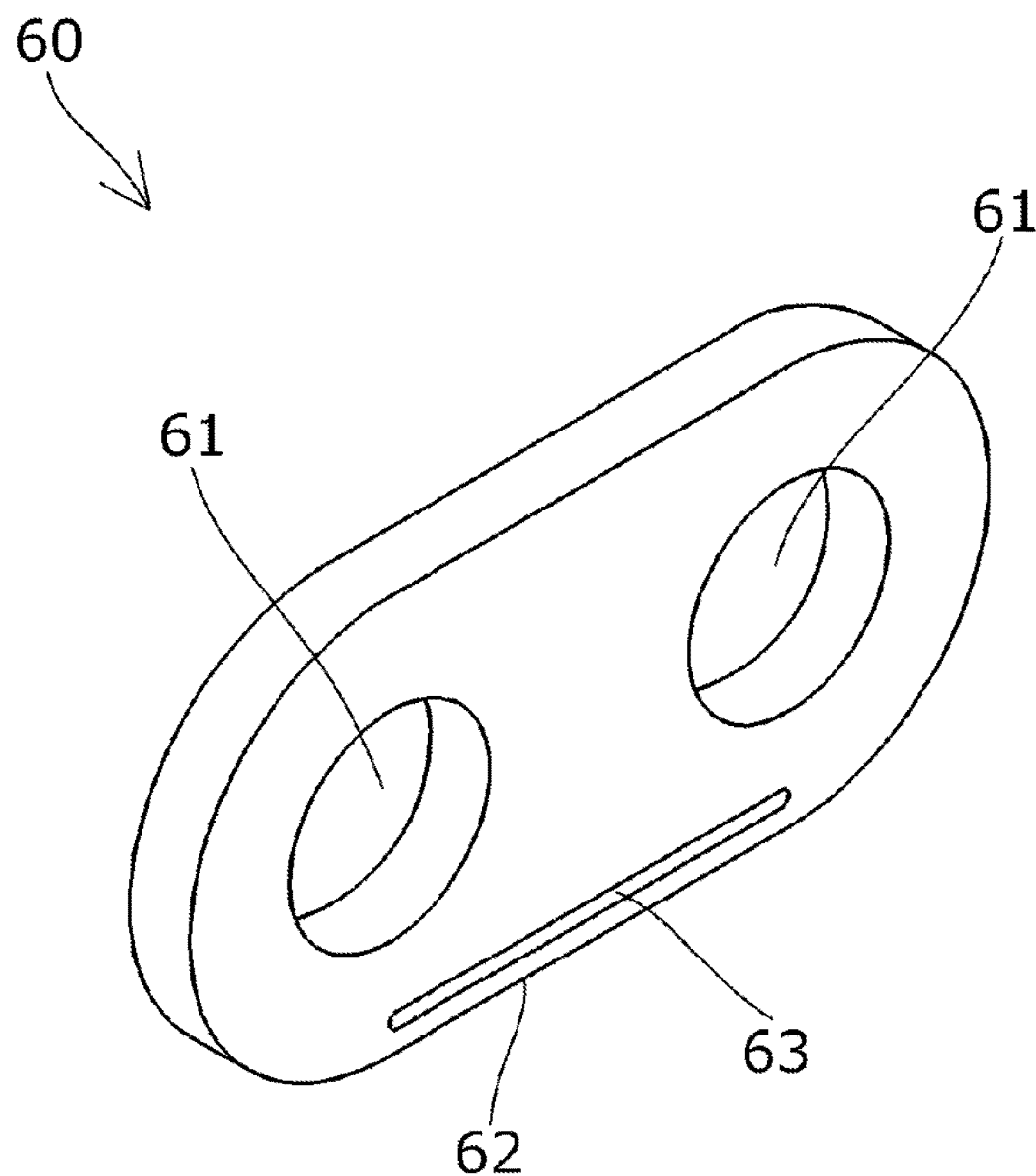
FIG. 8A is an explanatory view showing the outer plate according to Embodiment 4.
Figure 8B:
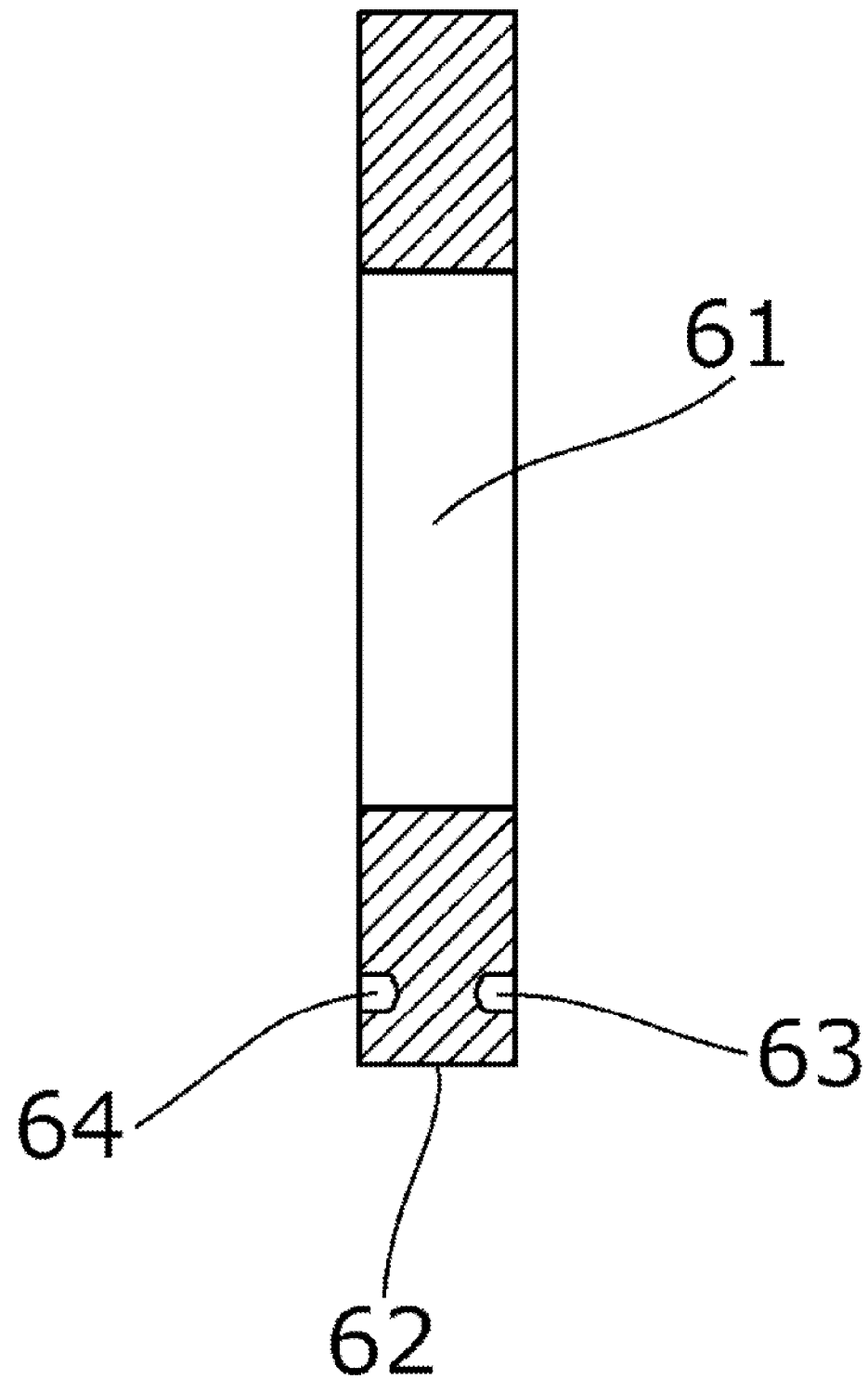
FIG. 8B is an explanatory view showing the outer plate according to Embodiment 4.

In Embodiment 4, as shown in FIGS. 8A and 8B, a second concave portion 64 is formed in an inner surface of the outer plate 60 at a position corresponding to the position of the concave portion 63 in the outer surface of the outer plate 60.

With this, since it is possible to make the shapes of the outer surface and the inner surface of the outer plate 60 identical to each other (i.e., make the front side and the back side of the outer plate 60 symmetrical), it is not necessary to cause the orientations (the front sides or the back sides) of the outer plates 60 to face the same direction when the chain is assembled, and it is possible to reduce manufacturing cost. In addition, as shown in FIG. 9, it is possible to cause the second concave portion 64 to perform a function as an oil storage portion, and hence it is possible to reduce sliding resistance between the outer plate 60 and the inner plate 40.

Next, the chain transmission device 10 according to Embodiment 5 of the present invention will be described based on FIGS. 10A and 10B and FIG. 11. Herein, Embodiment 5 is exactly the same as Embodiment 1 described above except part of the configuration of the outer plate 60, and hence the description of the configuration other than the difference will be omitted.

Figure 10A:
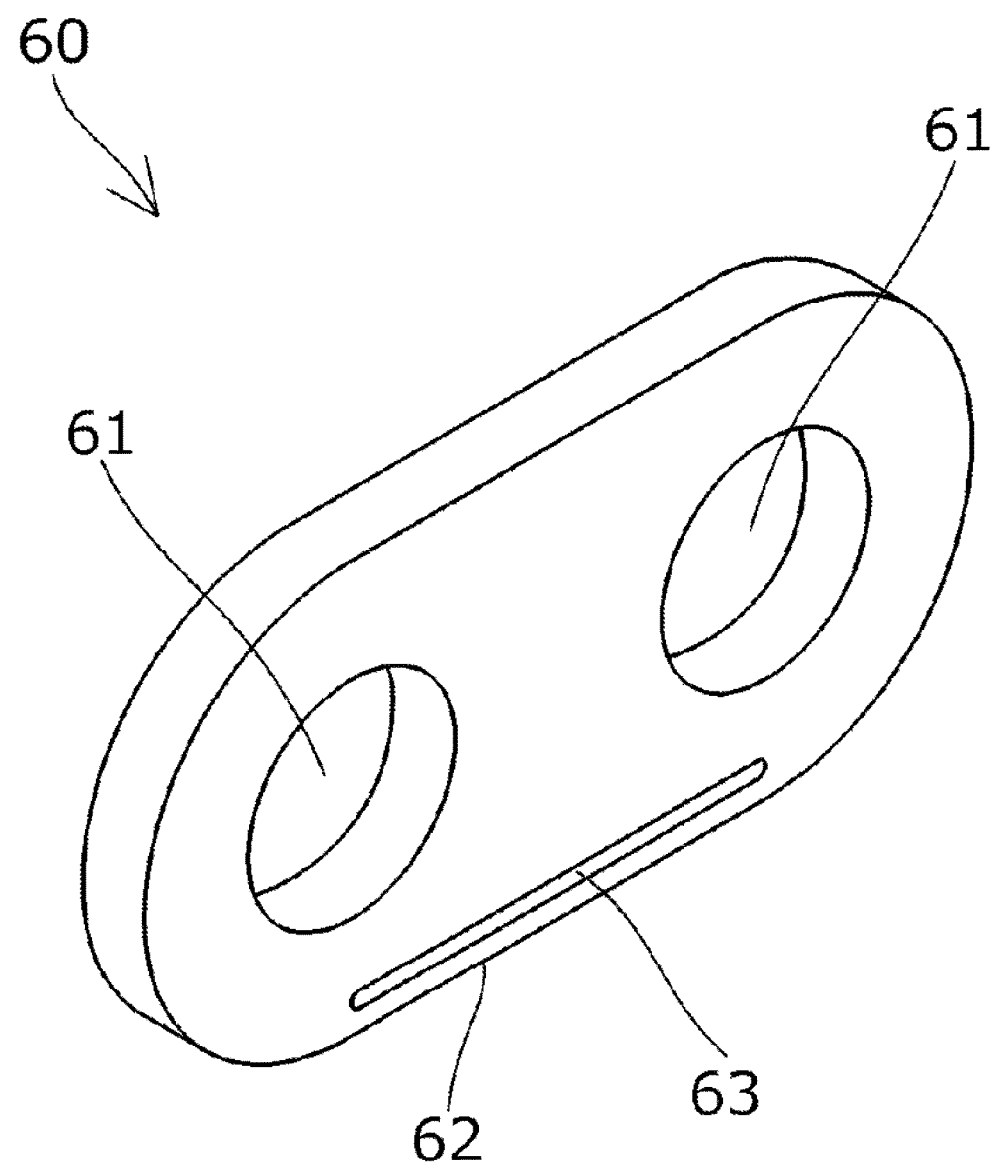
FIG. 10A is an explanatory view showing the outer plate according to Embodiment 5.
Figure 10B:
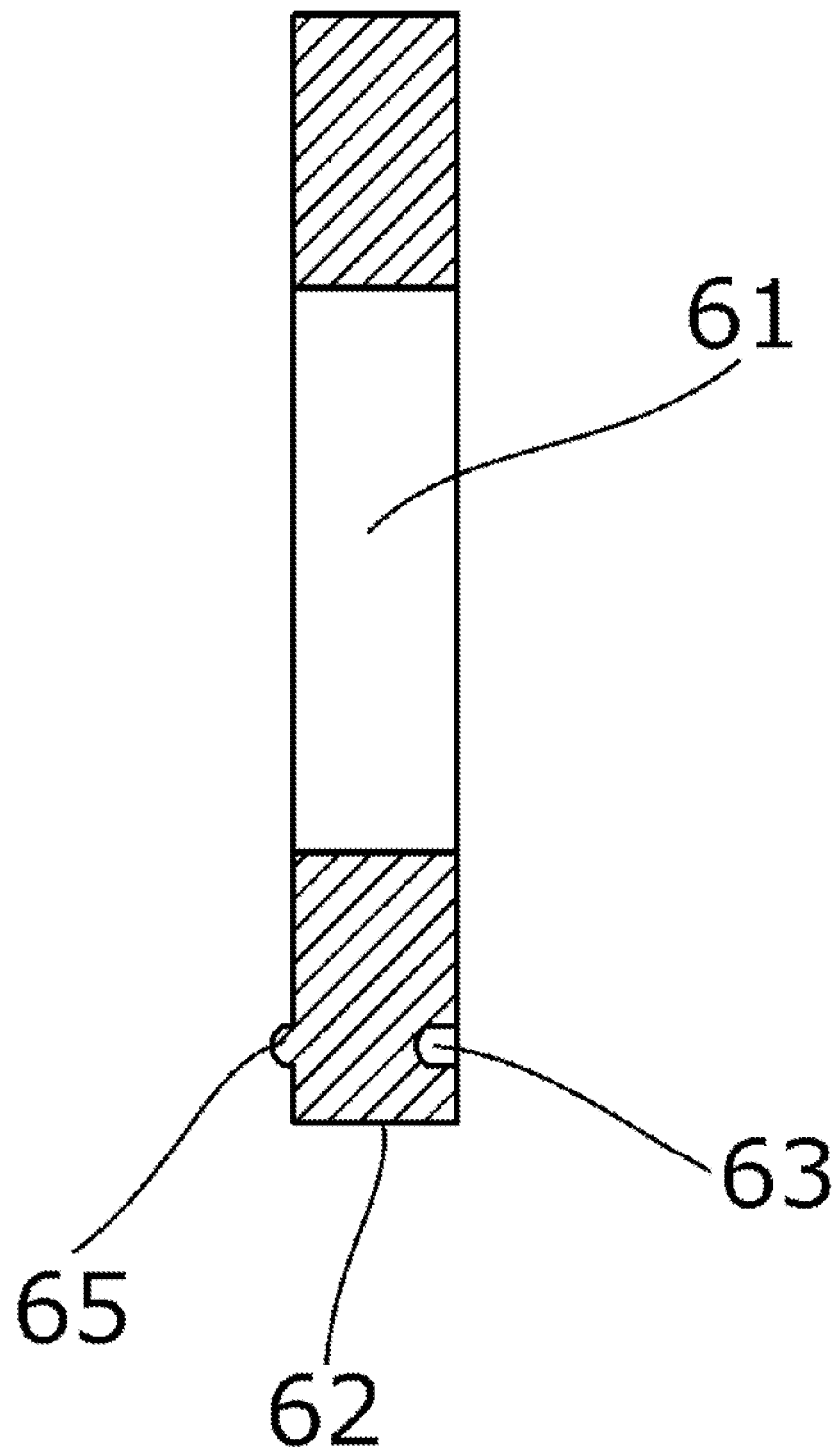
FIG. 10B is an explanatory view showing the outer plate according to Embodiment 5.

In Embodiment 5, as shown in FIGS. 10A and 10B, a convex portion 65 is formed in the inner surface of the outer plate 60 at a position corresponding to the position of the concave portion 63 in the outer surface of the outer plate 60. Note that it is preferable to form the apex of the convex portion 65 into a curved surface.

The concave portion 63 is formed together with the convex portion 65 by press working that presses part of the outer plate 60 from the outer surface side to the inner surface side. Note that the concave portion 63 and the convex portion 65 may also be formed by other methods such as machining.

Figure 11:
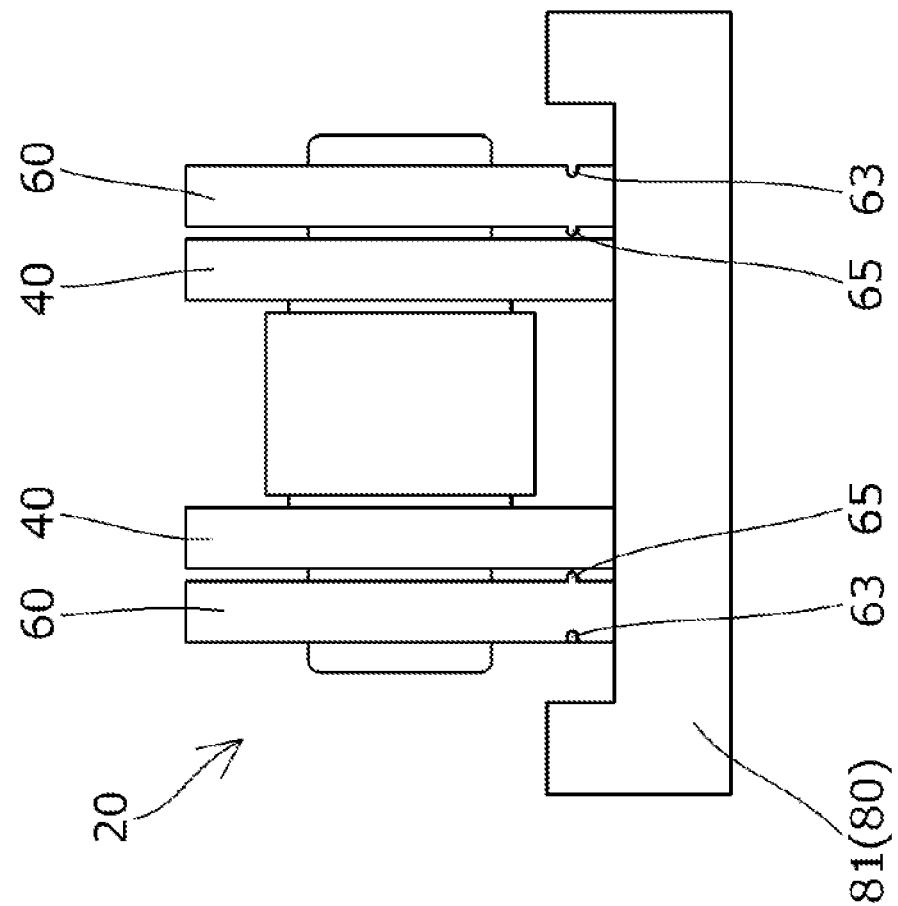
FIG. 11 is an explanatory view showing the chain traveling state on the chain guide in Embodiment 5.

In Embodiment 5 obtained in this manner, as shown in FIG. 11, with the presence of the convex portion 65 that protrudes from the inner surface side of the outer plate 60, it is possible to avoid an increase in the sliding resistance between the inner surface of the outer plate 60 and the outer surface of the inner plate 40 resulting from adhesion between the inner surface of the outer plate 60 and the outer surface of the inner plate 40 caused by surface tension of a lubricant.

Next, a modification common to Embodiments 1 to 5 will be described below. Note that, hereinbelow, only differences from Embodiments 1 to 5 will be described.

Figure 12A:
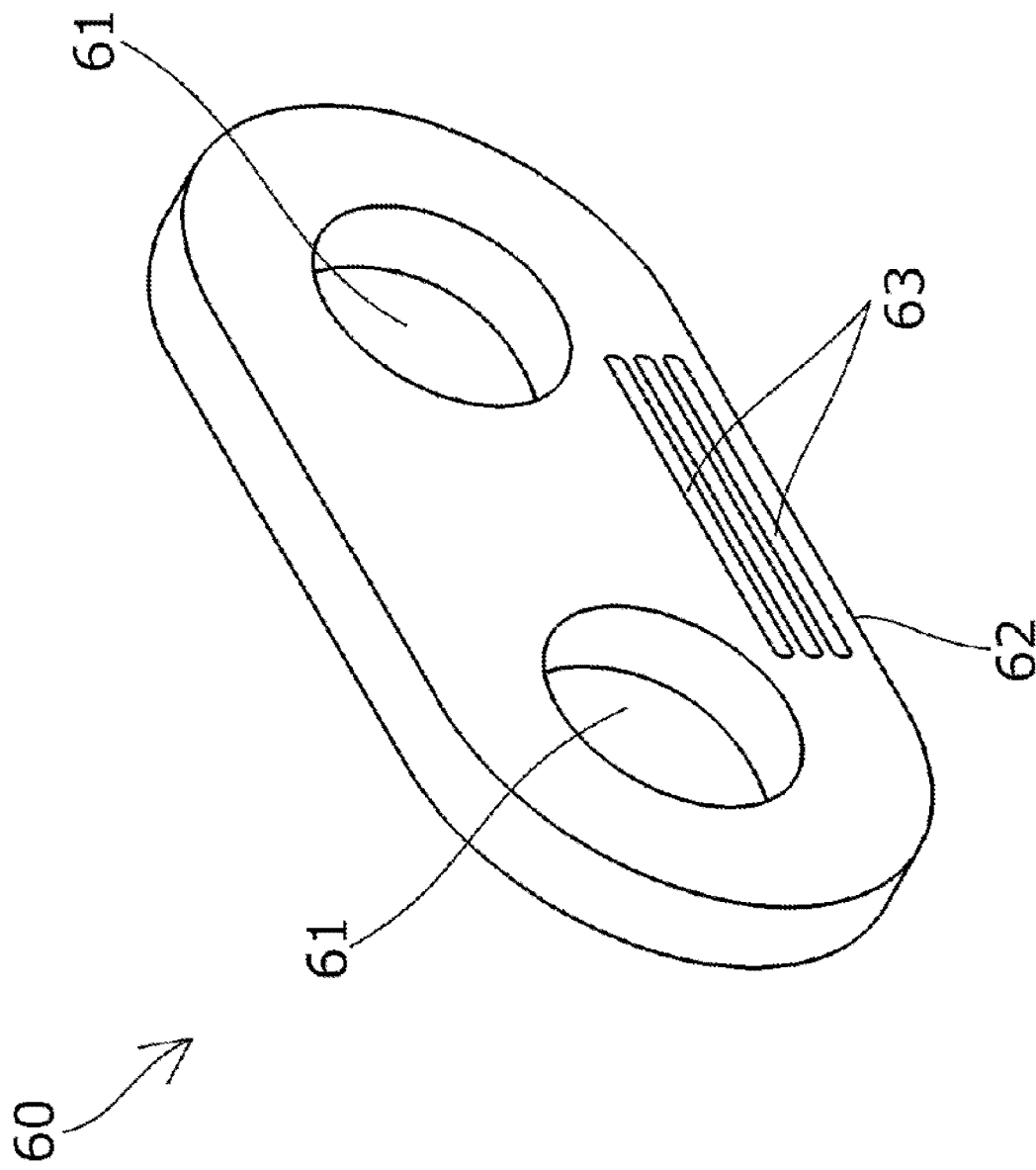
FIG. 12A is an explanatory view showing a modification of the outer plate.
Figure 12B:
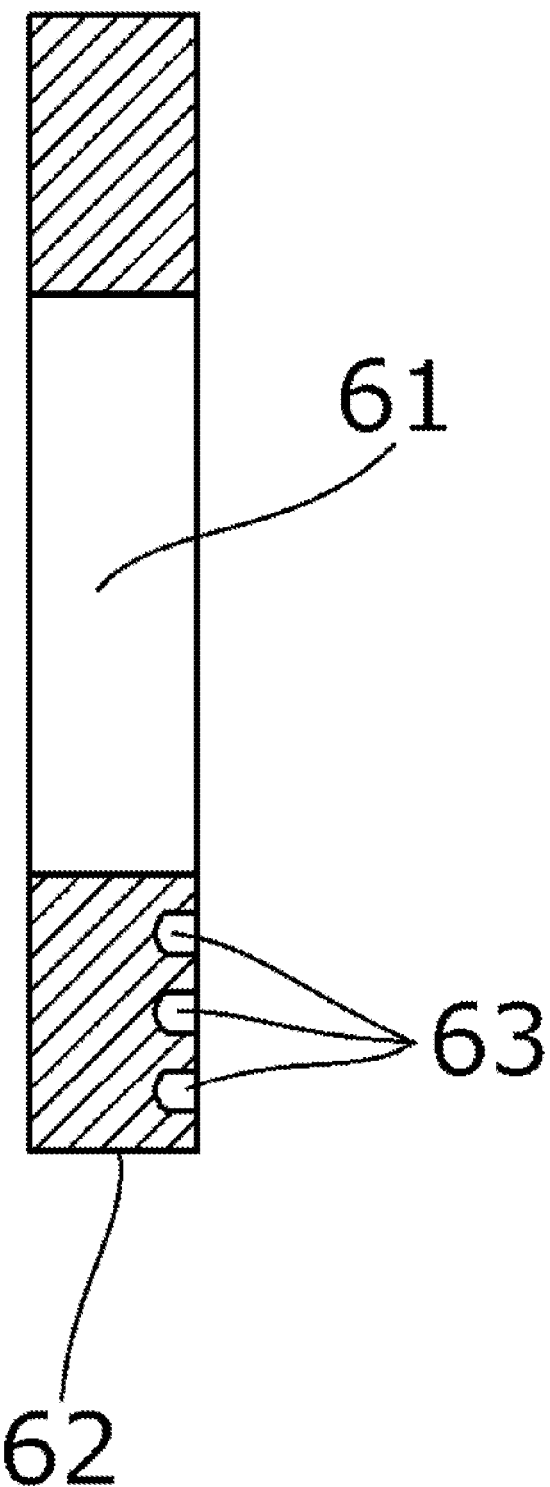
FIG. 12B is an explanatory view showing the modification of the outer plate.

That is, as in examples shown in FIGS. 12A and 12B, the concave portion 63 may be formed in plurality so as to be arranged in the plate height direction. Note that, each of FIGS. 12A and 12B shows the example in which the plurality of concave portions 63 in Embodiment 1 are arranged in the plate height direction, but the plurality of concave portions 63 (and the second concave portions 64 and the convex portions 65) in Embodiments 2 to 5 may also be formed so as to be arranged in the plate height direction.

Thus, the embodiments of the present invention have been described in detail, but the present invention is not limited to the above embodiments, and various design changes can be made without departing from the present invention described in the scope of claims.

For example, the chain transmission device may be constituted by arbitrarily combining the configurations of the plurality of embodiments described above.

In addition, in each of the embodiments described above, the description has been made on the assumption that the chain is the so-called roller chain, but the specific configuration of the chain may be any configuration as long as a plurality of link plates are pivotably connected with the connecting pin in the configuration, and the chain may also be, e.g., a bushing chain or a silent chain.

Further, in each of the embodiments described above, the description has been made on the assumption that the chain is a timing chain for the automobile engine, but the specific use of the chain may be any use.

In addition, in each of the embodiments described above, the description has been made on the assumption that the chain travels in the state in which the guide-side end surfaces (lower end surfaces) of the outer plate and the inner plate are caused to slide on the traveling guide surface of the chain guide, but the specific configuration of the chain is not limited to the above configuration. For example, only the guide-side end surface of the outer plate may be caused to come into contact with the traveling guide surface during the traveling of the chain, and only the guide-side end surface of the inner plate may also be caused to come into contact with the traveling guide surface during the traveling of the chain.

Further, in each of the embodiments described above, the chain guide is configured as a swinging guide that is swingably mounted to the engine block (mounting target), but the chain guide may also be configured as a fixed guide that is fixed to the engine block.

In addition, in each of the embodiments described above, the description has been made on the assumption that the chain guide is constituted by the guide shoe and the base member, and both of the traveling guide surface and the guide lip portion are formed in the guide shoe, but the specific configuration of the chain guide is not limited thereto. For example, the entire chain guide may be formed integrally, and the guide lip portion may be formed in the base member.

Further, in each of the embodiments described above, the description has been made on the assumption that the guide lip portions are formed at the both ends of the traveling guide surface in the guide width direction, but it is only necessary to form the guide lip portion at least at one end of the traveling guide surface in the guide width direction.

In addition, in each of the embodiments described above, the description has been made on the assumption that the concave portion is formed into the belt-like shape that extends along the chain longitudinal direction, but the specific shape of the concave portion is not limited to the above shape. For example, the concave portion may also be formed into a depressed shape (that does not extend along the chain longitudinal direction).

What is claimed is:

1. A chain comprising:
a plurality of link plates; and
connecting pins that pivotably connect the plurality of link plates, wherein
the plurality of link plates include outer plates disposed on both outer sides in a chain width direction,
each of the outer plates has a pair of front and rear pin holes into which the connecting pins are inserted, a guide-side end surface that faces a traveling guide surface side of a chain guide, a concave portion as an oil storage portion that is formed in an outer surface of the respective outer plate, and a convex portion formed in an inner surface of the respective outer plate at a position corresponding to a position of the concave portion in the outer surface of the respective outer plate,
the concave portion as the oil storage portion and the convex portion are formed into a belt-like shape that extends along a chain longitudinal direction, in a position away from the guide-side end surface in an area between the pin holes and the guide-side end surface in a plate height direction, and
both ends of the concave portion and both ends of the convex portion are positioned outwardly, in the chain longitudinal direction, of a line that passes through a center of the pin hole and extends in a direction orthogonal to the chain longitudinal direction.

2. A chain transmission device comprising:
the chain according to claim 1; and
a chain guide that slidably guides the chain, wherein
the chain guide has a traveling guide surface that slidably guides the chain, and a guide lip portion that protrudes upward at least at one end of the traveling guide surface in a guide width direction, and
the concave portion is formed at a height position such that the concave portion faces an inner surface of the guide lip portion when the chain is displaced to one side in the chain width direction.

* * * * *